United States Patent [19]

Föhl

[11] Patent Number: 5,069,482
[45] Date of Patent: Dec. 3, 1991

[54] FORCE LIMITER FOR SAFETY BELT RESTRAINING SYSTEMS

[75] Inventor: Artur Föhl, Schorndorf, Fed. Rep. of Germany

[73] Assignee: TRW Repa GmbH, Alfdorf, Fed. Rep. of Germany

[21] Appl. No.: 590,089

[22] Filed: Sep. 28, 1990

[30] Foreign Application Priority Data

Oct. 9, 1989 [DE] Fed. Rep. of Germany ....... 3933721

[51] Int. Cl.⁵ ............................................. B60R 22/28
[52] U.S. Cl. .................................... 280/801; 280/805; 280/808
[58] Field of Search ................... 280/805, 801, 808; 297/471, 472; 403/2; 188/371, 374, 67

[56] References Cited

U.S. PATENT DOCUMENTS 3,583,530 6/1971 DeVenne ............................ 280/805
3,858,904 1/1975 Saxl ..................................... 280/805

FOREIGN PATENT DOCUMENTS 1750521 2/1972 Fed. Rep. of Germany .
2349891 4/1975 Fed. Rep. of Germany .
2918179 6/1980 Fed. Rep. of Germany .
3233797 1/1983 Fed. Rep. of Germany .
3829975 5/1989 Fed. Rep. of Germany .

Primary Examiner—Kenneth R. Rice
Assistant Examiner—M. Shaughnessy
Attorney, Agent, or Firm—Tarolli, Sundheim & Covell

[57] ABSTRACT

In a cylinder a rod is received which at its one end projects out of the cylinder and at its other end defines a free space in which a plurality of roller elements are accommodated. The outer diameter of the annular arrangement formed by the roller elements is greater than the inner diameter of the cylinder bore. Under a high tensile load between the cylinder and rod the roller elements penetrate into the material of the cylinder wall and with formation of longitudinal grooves deformation work is performed by which a high energy amount is converted and load peaks eliminated from the belt system.

2 Claims, 2 Drawing Sheets

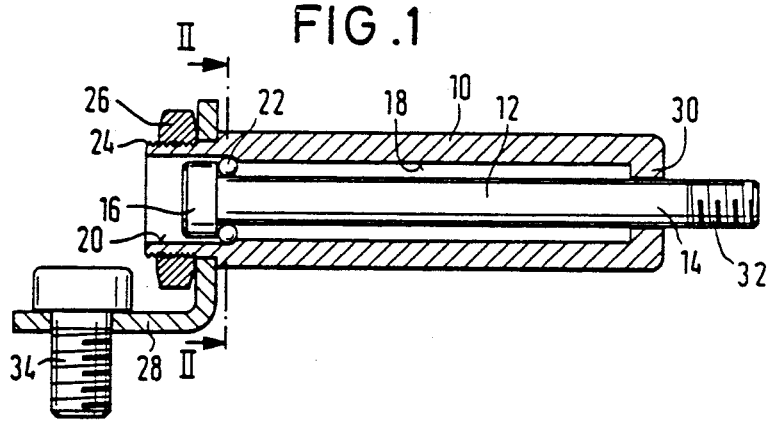
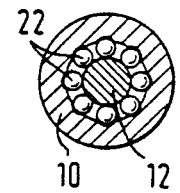
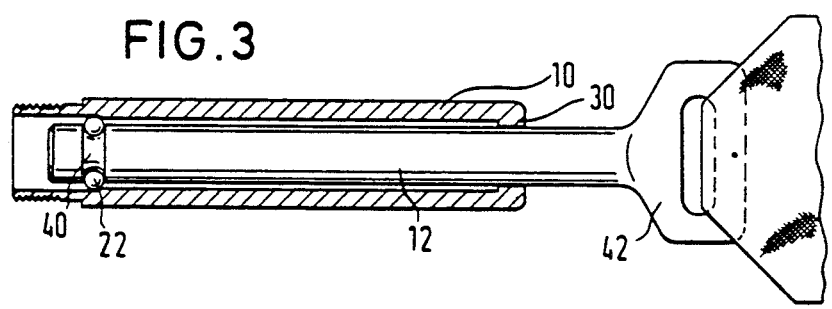
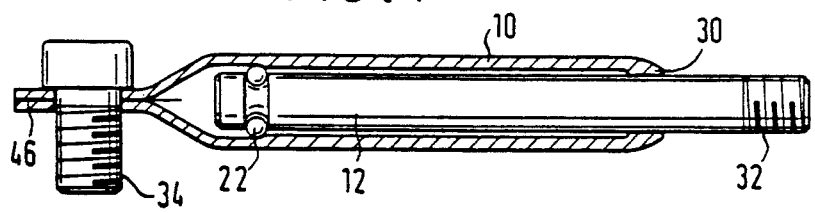
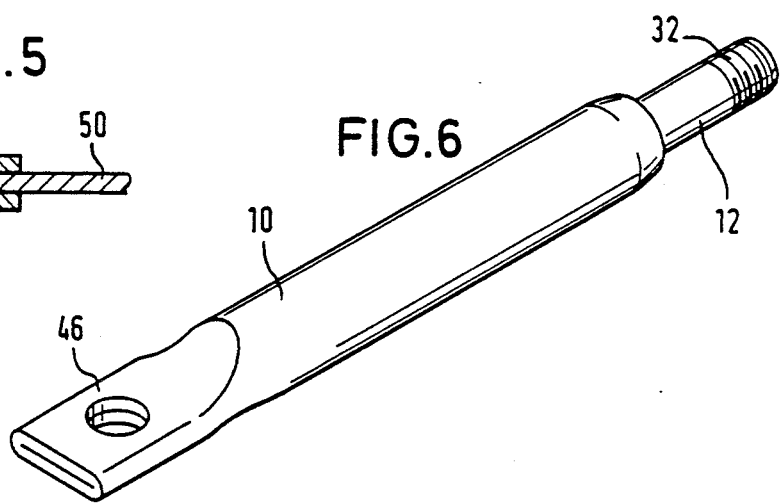

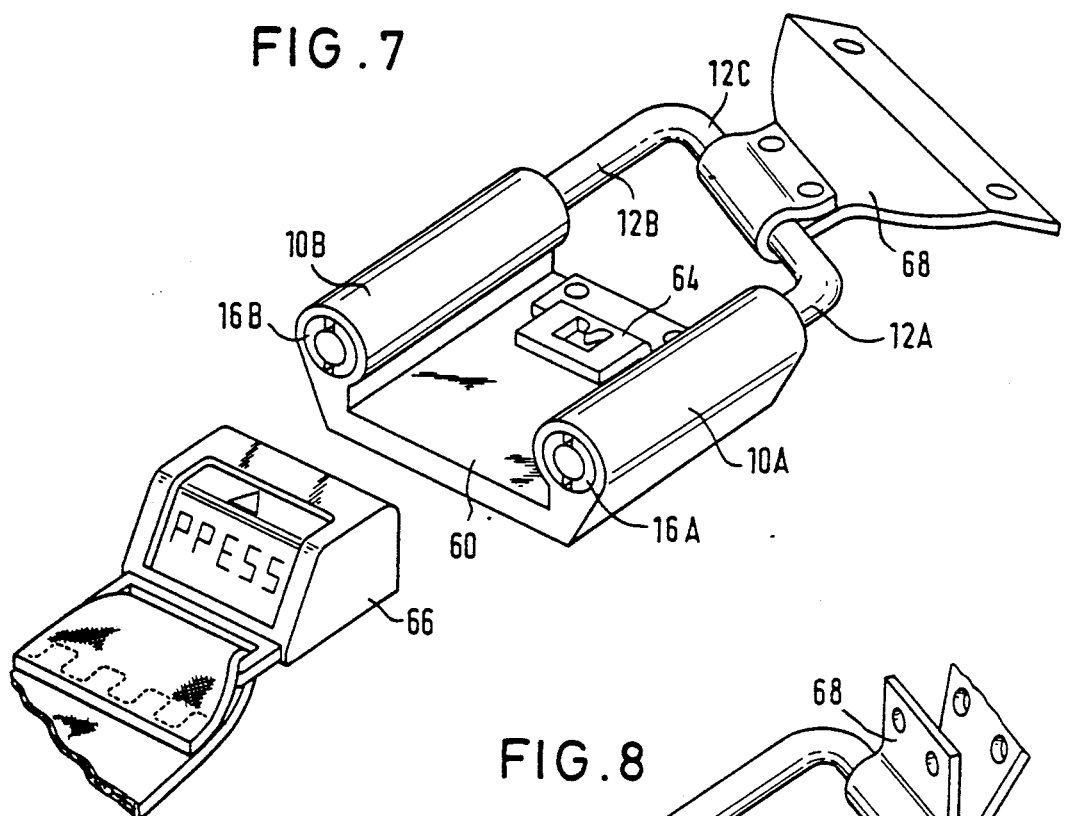
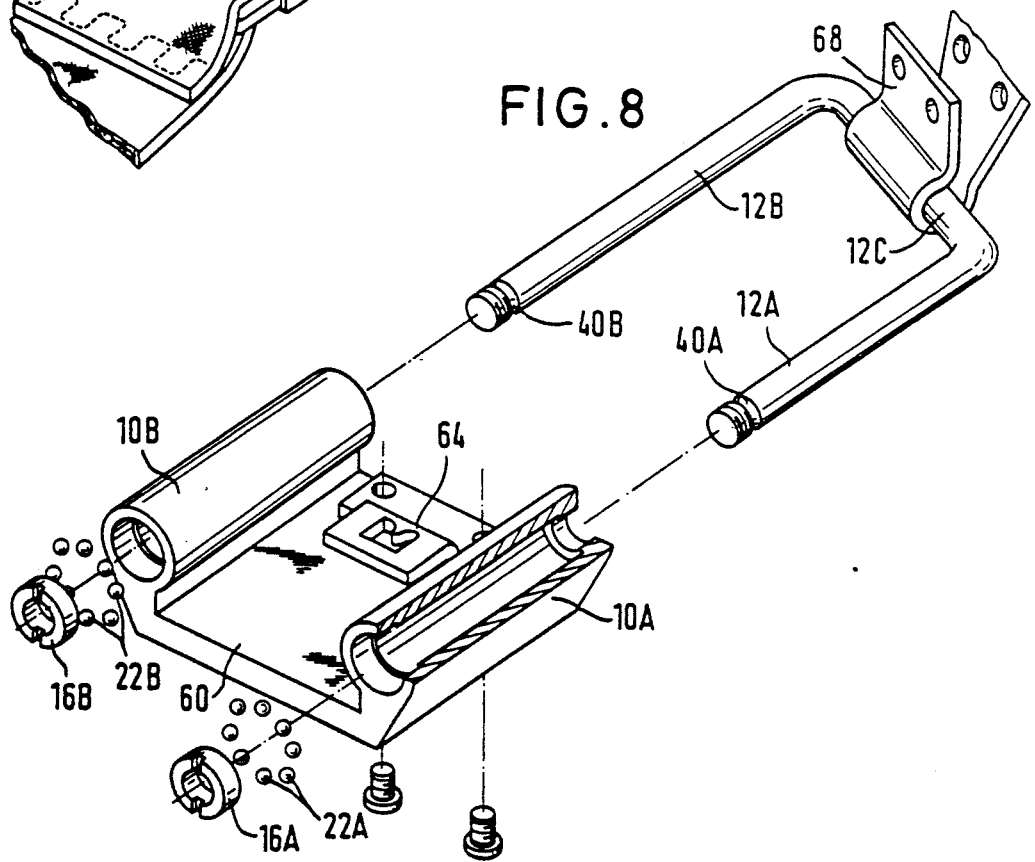

FORCE LIMITER FOR SAFETY BELT RESTRAINING SYSTEMS

The invention relates to a force limiter for safety belt restraining systems comprising at least one cylinder on which a first fitting engages and a rod which is longitudinally displaceably accommodated in the cylinder and on the end of which projecting out of the cylinder a second fitting engages, the force limiter being inserted via the first and second fitting into the force flow path of the safety belt system.

The purpose of force limiters of this type is to diminish load peaks in the safety belt system and thus preserve the vehicle occupants from excessively high acceleration values. A great variety of constructional forms of force limiters has already been proposed. However, there is still a need for particularly compactly constructable but nevertheless highly effective force limiters which can easily be integrated into conventional safety belt restraining systems.

The invention is based on the problem of providing a force limiter for safety belt restraining systems which is distinguished by a small overall size and can easily be integrated into conventional safety belt restraining systems. This problem is solved according to the invention in a force limiter of the type set forth at the beginning in that in an annular free space defined radially inwardly by the rod, radially outwardly by the inner wall of the cylinder and axially on at least one side by an annular shoulder, a plurality of roller elements are arranged uniformly distributed in the peripheral direction and that the material properties of the cylinder and the diameter of the roller elements are adapted to each other in such a manner that the rod and the cylinder under tensile load between the fittings are pulled apart against a reproduceably defined inhibiting force and with deformation of the inner wall of the cylinder and formation of longitudinal grooves by penetration of the roller elements into the material of the cylinder. It has been found that by the deformation of the material of the cylinder wall by means of the roller elements penetrating into said wall high energy amounts can be converted in an extremely small volume. The conversion of the energy introduced from the belt system to deformation work for deforming and plastic deformation of the material of the cylinder wall takes place uniformly over the entire stroke of the rod in that uniformly deep longitudinal grooves are formed at the inner side of the cylinder wall. Each individual roller element opposes the pulling apart of cylinder and rod with an easily controllable inhibiting force which is overcome by performing deformation work. An optimum use of the space available is achieved if the roller elements adjoin each other in the peripheral direction. The longitudinal grooves at the inner side of the cylinder wall can thus run close together without impairing the total inhibiting effect by interaction between the adjacent roller elements.

In the preferred embodiment the rolling bodies or roller elements are steel balls whereas the cylinder consists of a material such as aluminum or an aluminium alloy. Thus, for the roller elements preferably a hard material is used whilst for the cylinder wall a relatively soft material is used which is easily plastically deformable.

A particularly simple construction is obtained if the cylinder is formed as a simple tube which at its one end is provided with a mounting thread or squashed flat to form a fitting part and at its other end is upset to form a stop for the roller elements which prevents the rod from being completely withdrawn from the cylinder.

Further features and advantages of the invention will be apparent from the following description and the drawings to which reference is made and in which:

FIG. 1 shows a longitudinal section of a first embodiment of the force limiter;

FIG. 2 shows a cross-section of the force limiter along the line II—II of FIG. 1;

FIG. 3 is a longitudinal section of another embodiment of the force limiter;

FIG. 4 is a longitudinal section of a further embodiment of the force limiter;

FIG. 5 is a detail view of the securing of a fitting part;

FIG. 6 is a perspective view of the embodiment of the force limiter shown in FIG. 4;

FIG. 7 is a perspective view of a further embodiment of the force limiter and

FIG. 8 is an exploded perspective view for illustrating the construction of the force limiter shown in FIG. 7.

In the embodiment of the force limiter shown in FIG. 1 in a cylindrical tube 10 of aluminium a rod 12 is received, the one end 14 of which projects from the cylinder 10 and the other end of which is provided with a piston-like head 16. The outer diameter of the rod 12 is smaller than the inner diameter of the cylinder bore 18. The head 16 is received with slight play in a widened bore portion 20 of the cylinder 10 which merges via a step or shoulder into the cylinder bore 18. Between the annular shoulder formed by the head 16 and the transition between the cylinder bore 18 and the widened bore portion 20 a free space is formed which is defined radially inwardly by the outer surface of the rod 12 and in which a number of roller elements 22 are arranged distributed uniformly in the peripheral direction. In the embodiment shown a total of eight roller elements 22 is present and they are formed as steel balls and at least approximately adjoin each other in the peripheral direction. The outer diameter of the annular arrangement formed by the roller elements 22 is greater than the inner diameter of the cylinder bore 18. The cylinder 10 is provided at its end facing the head 16 with an outer thread 24 on which a screw nut 26 can be screwed for securing a fitting part 28 in the form of a sheet metal angle piece to the cylinder 10. The opposite end of the cylinder 10 is provided with a radially inwardly directed annular shoulder 30 forming a stop for the roller elements 22. The end of the rod 12 projecting out of the cylinder 10 is provided with an outer thread 32 for securing a second fitting.

The force limiter described is introduced via the fitting 28 and the fitting secured to the rod 12 into the force flow of a safety belt restraining system. For example, the fitting 28 is secured by means of a threaded bolt 34 to the vehicle bodywork whilst to the rod 12 a belt lock, a deflection or end fitting or the like, is secured by means of the outer thread 32. If via the two fittings a high tensile stress is applied between the rod 12 and the cylinder 10 the roller elements 22 penetrate into the material of the inner wall of the cylinder 10 and press said material radially outwardly and axially in the tension direction so that parallel longitudinal grooves are formed in the inner side of the cylinder bore 18. Said longitudinal grooves may have a depth of a few tenths of a millimetre. Both a plastic deformation of material and a deformation of the cylinder 10 take place. In this process, before the roller elements 22 are arrested at the annular shoulder 30 a considerable amount of energy introduced from the belt system is converted to deformation work. At the same time load peaks in the belt system are diminished and consequently a flat force profile is obtained and the vehicle occupant is protected from high accelerations.

The cylinder 10 may also consist of a harder material than aluminium, for example a relatively thin steel tube, if the roller elements 22 are of hardened steel. With such a choice of materials a greater proportion of deformation work is performed and a relatively smaller proportion of work for plastic deformation.

The embodiment illustrated in FIG. 3 differs from that according to FIGS. 1 and 2 only in that the roller elements 22 are received in an encircling groove 40 at the end of the rod 12 and the latter otherwise has the same diameter over its entire length. Furthermore, a fitting 42 in the form of an eye is integrally formed on the end thereof projecting out of the cylinder 10.

The embodiment according to FIGS. 4 and 6 differs from that according to FIG. 3 in that the cylinder 10 is squashed flat at its end adjacent the roller elements 22 to form a fitting part 46. The fitting part 46 provided with a bore can be secured directly by a mounting bolt 34 to the vehicle bodywork or for example also to the vehicle seat. The annular shoulder 30 at the end of the cylinder 10 remote from the fitting part 46 may be made by upsetting so that the entire cylinder 10 can be made from a simple tube length.

In the variant shown in FIG. 5 a fitting part 50 is inserted into a slot at the free end of the rod 12 and there secured.

The embodiment shown in FIG. 7 is particularly suitable for a passive safety belt system. Two cylinders 10A, 10B are arranged parallel to each other on a fitting plate 60 and along the side edges of said plate 60. A rod 12A, 12B projects from each cylinder 10A, 10B. The unit formed from the cylinder 10A, 10B and rod 12A, 12B is fundamentally made up in the same manner as the embodiments of the force limiter described above. FIG. 8 shows a respective encircling groove 40A, 40B at the end of the rod 12A, 12B and the corresponding roller elements 22A, 22B. The rods 12A, 12B are provided at their end received in the cylinder 10A, 10B in each case with a screwed-on head piece 16A, 16B. At their opposite end the rods 12A, 12B are connected together by a generally U-shaped stirrup member 12C which in the preferred embodiment is made in one piece with said rods. Between the cylinders 10A, 10B to the fitting plate 60 an insert rod 64 is secured and forms a slide path for a small belt lock 66. Connected to the stirrup member 12C is a fitting part 68, FIGS. 7 and 8 each showing a variant thereof.

In the embodiment according to FIGS. 7 and 8 a particularly compact construction is achieved because the sharing of the force limitation amongst two cylinders leads to a flat design in which each individual cylinder has a smaller diameter than the single cylinder in the embodiments according to FIGS. 1 to 6.

I claim:

1. A force limiter for use in a safety belt restraining system having a force flow path and first and second fittings, said force limiter comprising:

a fitting plate having parallel edges and having two spaced-apart parallel cylinders formed therein along said edges, and two rods associated each with a respective cylinder and having ends projecting out of the cylinders, said ends of said rods being connected by a stirrup member to which the second fitting is secured; and at least one of said cylinders engaging the first fitting of the safety belt restraining system and its respective rod being longitudinally displaceably accommodated in said one cylinder and said force limiter being inserted via the first and second fittings into the force flow path of the safety belt system, said force limiter comprising an annular free space defined radially inwardly by the rod, radially outwardly by the inner wall of the cylinder and axially on at least one side by an annular shoulder, an annular array of roller elements being arranged in said annular free space and uniformly distributed in the peripheral direction, the cylinder being made of a plastically deformable relatively soft material, the roller elements being made of a relatively hard material, the annular array of roller elements having a diameter selected such that upon longitudinal displacement of said rod in said cylinder said roller elements penetrate into the material of the cylinder and perform a deformation work on the inner wall of the latter resulting in the formation of longitudinal grooves into the material of the cylinder, to thereby define a reproduceably defined inhibiting force when the rod and the cylinder are pulled apart under tensile load between the fittings of the safety belt restraining system.

2. A force limiter according to claim 1, for use in a safety belt restraining system having a belt lock, wherein an insert rod is secured to said fitting plate and a slide path is formed in said fitting plate between said cylinders, said slide path being adapted for receiving the belt lock of the safety belt restraining system and said insert rod being adapted for cooperating with the belt lock of the safety belt restraining system.

* * * * *